(12) United States Patent
Price et al.

(10) Patent No.: US 6,874,938 B2
(45) Date of Patent: Apr. 5, 2005

(54) JACKETED RECLOSABLE CONTAINER

(75) Inventors: William D. Price, Midland, MI (US); William E. Shrum, St. Louis, MI (US)

(73) Assignee: S.C. Johnson Home Storage, Inc., Racine, WI (US)

(*) Notice: Subject to any disclaimer, the term of this patent is extended or adjusted under 35 U.S.C. 154(b) by 330 days.

(21) Appl. No.: 10/127,361

(22) Filed: Apr. 22, 2002

(65) Prior Publication Data

US 2003/0198721 A1 Oct. 23, 2003

(51) Int. Cl.[7] .............................................. B65D 30/08
(52) U.S. Cl. ........................ 383/109; 383/38; 383/63; 383/104; 383/122; 383/210; 383/120
(58) Field of Search .................................. 383/109, 111, 383/63, 210, 38, 40, 104, 121, 122

(56) References Cited

U.S. PATENT DOCUMENTS

| | | |
|---|---|---|
| 2,876,112 A | 3/1959 | Vail |
| 3,494,457 A | 2/1970 | Titchenal |
| 3,608,566 A | 9/1971 | Storandt |
| 3,730,240 A | 5/1973 | Presnick |
| 3,734,394 A | 5/1973 | Dooley |
| 3,759,722 A | 9/1973 | Simon |
| 4,145,449 A | 3/1979 | Nelham |
| 4,155,453 A | 5/1979 | Ono |
| 4,172,152 A | 10/1979 | Carlisle |
| 4,363,345 A | 12/1982 | Scheibner |
| 4,411,358 A | 10/1983 | Bennwik et al. |
| 4,528,224 A | 7/1985 | Ausnit |
| 4,561,109 A | 12/1985 | Herrington |
| 4,691,368 A | 9/1987 | Roessiger |
| 4,735,308 A | 4/1988 | Barner |
| 4,755,064 A | 7/1988 | Weber |
| 4,846,586 A | 7/1989 | Bruno |
| 4,886,373 A | 12/1989 | Corella |
| 4,902,521 A | 2/1990 | Rosenfeld |
| 4,913,761 A | 4/1990 | Russell et al. |
| 4,923,701 A | 5/1990 | VanErden |
| 4,925,711 A | 5/1990 | Akao et al. |
| 4,951,666 A | 8/1990 | Inman et al. |
| 4,978,231 A | 12/1990 | Ling et al. |
| 4,993,844 A * | 2/1991 | Robinson et al. ............. 383/38 |
| 5,012,561 A | 5/1991 | Porchia et al. |
| 5,070,584 A | 12/1991 | Dais et al. |
| 5,174,657 A | 12/1992 | Peppiatt |
| 5,281,027 A | 1/1994 | Thrall |
| 5,292,392 A | 3/1994 | Miller et al. |
| 5,372,429 A | 12/1994 | Beaver, Jr. et al. |
| 5,628,404 A | 5/1997 | Hendrix |
| 5,804,265 A | 9/1998 | Saad et al. |
| 5,881,883 A | 3/1999 | Siegelman |
| 6,371,645 B1 * | 4/2002 | Rusert et al. ............... 383/107 |
| 6,632,403 B1 * | 10/2003 | Barmore et al. ............ 422/102 |
| 6,634,384 B2 | 10/2003 | Skeens et al. |
| 6,719,678 B1 * | 4/2004 | Stern .......................... 493/212 |

FOREIGN PATENT DOCUMENTS

| | | |
|---|---|---|
| CH | 386 919 | 4/1965 |
| GB | 2 228 724 | 9/1990 |

* cited by examiner

Primary Examiner—Robin A Hylton

(57) ABSTRACT

A container includes a flexible bag including at least two bag sides in an opposed relationship wherein each bag side has two lateral edges, a bag closure extending from one lateral edge to another lateral edge, and a bag bottom spaced from the bag closure. The bag also includes a flexible jacket, external to the bag, the jacket having at least two jacket sides opposing the bag sides, and a jacket bottom. The jacket sides and the jacket bottom define a volume into which part of the flexible bag is disposed, such that the bag bottom is at least partially contained within the volume and is spaced from the jacket bottom.

10 Claims, 7 Drawing Sheets

JACKETED RECLOSABLE CONTAINER

BACKGROUND OF THE INVENTION

1. Field of the Invention

This invention relates generally to a jacketed reclosable container for use in storing food, and particularly to a container that is used in food preparation, such as microwave heating or thawing, as well as used in food storage, such as freezing, in which case the container prevents or reduces freezer burn. The invention also relates to a method of storing food using such a container.

2. Description of the Related Art

Conventional containers for use in freezing food have at least three disadvantages. First, the containers do not adequately prevent freezer bun, which occurs when air is permitted to contact the food, degrading the taste and texture of the food. Second, conventional containers are unsatisfactory for thawing food. If one simply placed the frozen food in the container into a microwave oven, hot spots would form, such that some regions of the food would be actually cooked while others would hardly thaw or even remain frozen. Third, conventional freezer containers are easily punctured, since they are comprised of a single thin layer of plastic.

Several attempts have been made to overcome the shortcomings of the conventional reclosable container. For example, U.S. Pat. No. 4,735,308 to Barner shows a compound food storage bag with a water-impermeable jacket having an absorbent inner bag. However, the storage bag in Barner does not prevent air from contacting the food, so its ability to prevent freezer burn is limited. A different approach, shown in U.S. Pat. No. 3,759,722 to Simon, effectively limits the air that contacts the food, but that approach requires a cumbersome tank fall of liquid.

Structures that were not intended for storing frozen food but that nevertheless use an inner liner or bag and an outer wall or jacket include U.S. Pat. No. 3,494,457 to Titchenal and U.S. Pat. No. 4,691,368 to Roessiger. However, each of these patents includes an inner liner that is totally surrounded by the outer wall. This structure is difficult to use for freezer bags designed to reduce freezer burn, because a fluid cannot be easily inserted between the inner liner and the outer wall without the risk of spilling the fluid into the inside of the inner liner.

There is a need for a reclosable container that prevents an air gap between the food and the bag. This bag should be easy to use and should effectively prevent hot spots from forming during microwave thawing. In addition, the bag should be tough and not easily punctured.

SUMMARY OF THE INVENTION

The invention addresses the foregoing needs in the art by providing a container that reduces or prevents freezer burn. According to a preferred embodiment, the container expels air from around the food in order to prevent or reduce freezer burn. Most preferably, the present invention addresses the foregoing needs by providing a container that includes a flexible bag having a reclosable top and a flexible jacket external to the bag.

In one aspect of the invention, a container comprises a flexible bag comprising at least two bag sides in an opposed relationship wherein each bag side has two lateral edges, a bag closure extending from one lateral edge to another lateral edge, and a bag bottom spaced from the bag closure.

The container also comprises a flexible jacket, external to the bag, the jacket comprising at least two jacket sides opposing the bag sides, and a jacket bottom. The jacket sides and the jacket bottom define a volume into which part of the bag is disposed, such that the bag bottom is at least partially contained within the volume and is spaced from the jacket bottom.

In another aspect of the invention, the bag and the jacket are attached at the lateral edges of the bag.

In yet another aspect of the invention, the jacket is attached to the bag to allow fluid communication from one bag side to an opposed bag side.

In yet another aspect of the invention, the jacket further comprises a top disposed near the bag closure, wherein at least a portion of the top of the jacket is not permanently attached to the bag.

In still another aspect of the invention, the jacket further comprises a jacket closure disposed on the jacket facing the bag adapted to temporarily maintain the jacket in contact with the bag.

In yet another aspect of the invention, the jacket further comprises a pleat disposed near the bottom of the jacket, such that the container can stand upright when the jacket contains fluid.

In yet another aspect of the invention, the jacket is continuously attached to the bag along the lateral edges of the bag sides from the bottom of the bag approximately to the bag closure.

In yet another aspect of the invention, a method of storing food using a container comprises the steps of providing a container, the container including (i) a flexible bag comprising at least two bag sides in an opposed relationship wherein each bag side has two lateral edges, a bag closure extending from one lateral edge to another lateral edge, and a bag bottom spaced from the bag closure, and (ii) a flexible jacket, external to the bag, the jacket comprising at least two jacket sides opposing the bag sides, and a jacket bottom. The jacket sides and the jacket bottom define a volume into which part of the bag is disposed, such that the bag bottom is at least partially contained within the volume and is spaced from the jacket bottom. The method comprises placing contents into the bag, inserting a fluid into a volume between the bag sides and the jacket sides, thereby expelling any air that may be disposed within the bag, closing the bag closure, and removing the fluid.

In still another aspect of the invention, the jacket further comprises a jacket closure disposed on the jacket facing the bag adapted to temporarily maintain the jacket in contact with the bag, and the method further comprises closing the jacket closure.

In still another aspect of the invention, the method may comprise placing the container is placed in the freezer after inserting the fluid into the volume and after closing the jacket closure.

In still another aspect of the invention, the method may comprise removing the fluid and thereafter placing the container into a freezer.

DETAILED DESCRIPTION OF THE PREFERRED EMBODIMENTS

Figure 1:
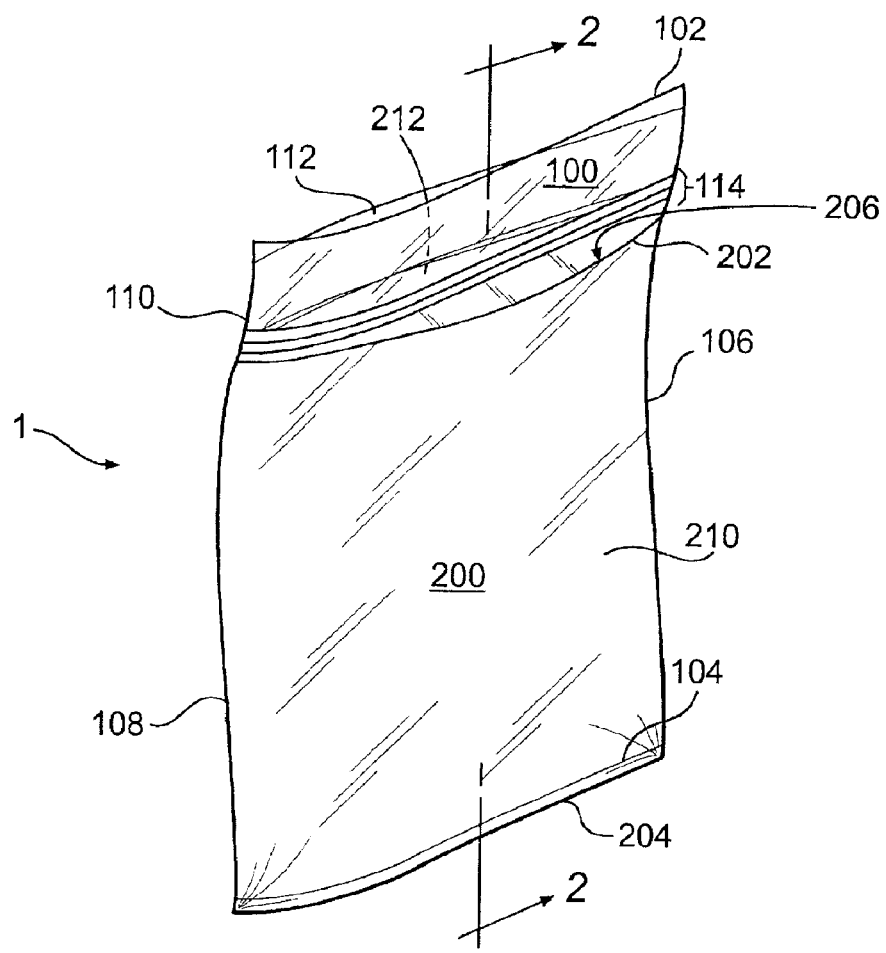
FIG. 1 shows a perspective view of a reclosable container according to this invention.
Figure 2:
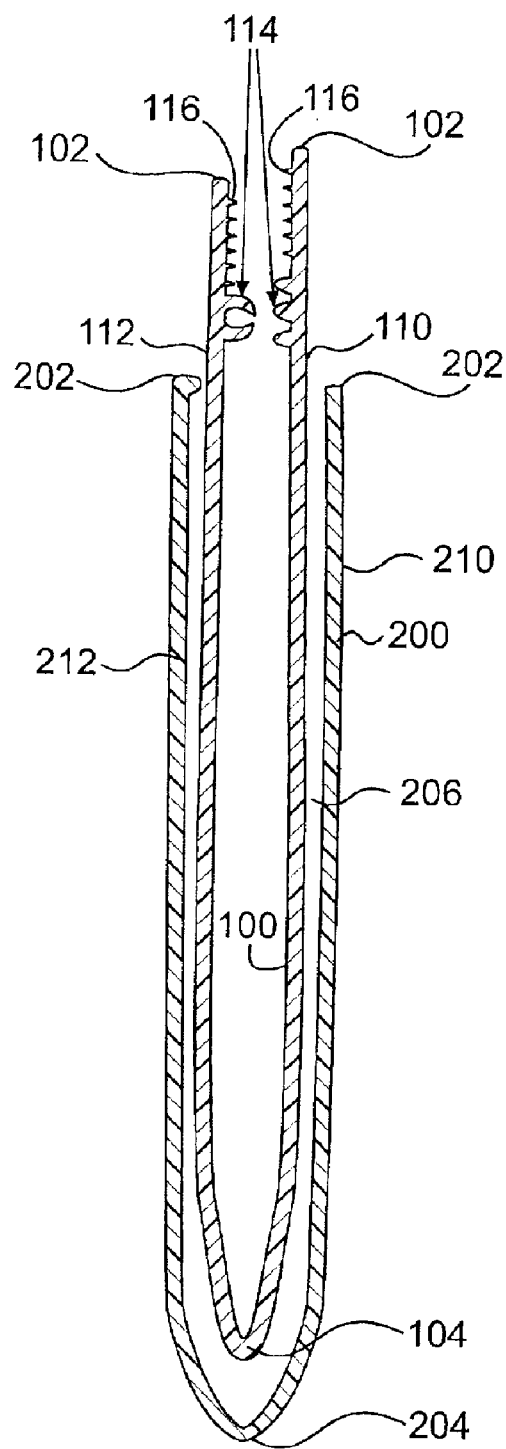
FIG. 2 shows a sectional view of a reclosable container according to this invention taken along the line 2—2 in FIG. 1.

FIGS. 1 and 2 show a reclosable container 1 according to a preferred embodiment that minimizes freezer burn and makes thawing more convenient. The container 1 generally includes a reclosable bag 100 and an external jacket 200. The arrangement makes it possible for a consumer to place food in the bag 100, partially close the bag 100 and expel air from between the bag 100 and food contained in the bag 100 by filling the jacket 200 with, for example, tap water. Moreover, the jacket 200 has the advantage of giving additional protection to the food and of improving thawing.

In the preferred embodiment, the container 1 is comprised of a bag 100 and an external jacket 200. The bag 100 has a top 102, opposed sides 110, 112 (best seen in FIG. 2), a zipper 114 disposed near the top 102 for closing the bag 100, a bottom 104 and lateral edges 106, 108. (Zipper 114 is discussed in more detail below.) Likewise, the jacket 200 has a top 202, sides 210, 212 opposing the sides 110, 112 of the bag 100 (best seen in FIG. 2), a bottom 204, and lateral edges which coincide with the lateral edges 106, 108 of the bag 100. The bag 100 is partially disposed within a volume 206, defined by the jacket bottom 204 and the jacket sides 210, 212, as shown in FIGS. 1 and 2.

The bag 100 may be comprised of any one of a variety of structures, such as a standard freezer bag or a ZIPLOC® brand DOUBLE GUARD™ bag sold by S.C. Johnson Home Storage, Inc. of Racine, Wis. A standard quart or gallon bag sold by S.C. Johnson Home Storage, Inc. is preferred as the bag 100, but other bag sizes may be used. Each of these bags is formed from a single sheet that is folded to form opposed sides and a folded bottom where the opposed sides meet. As shown in FIG. 2, the bag 100 of this invention preferably has opposed sides 110, 112 and a folded bottom 104.

The zipper 114 generally comprises two mating elements which, when closed, prevent the passage of fluid. Examples of suitable zippers and how they are made and attached to bags are found in U.S. Pat. No. 5,012,561, to Porchia, et al., U.S. Pat. No. 4,561,109 to Herrington, U.S. Pat. No. 4,363, 345 to Scheibner, U.S. Pat. No. 4,528,224 to Ausnit, and U.S. Pat. No. 5,070,584 to Dais, et al., each of which is incorporated herein by reference. Of course, any closure, in addition to or in place of a zipper, may be used to close the bag 100, including, as non-limiting examples, a zipper with a sliding closing mechanism, an adhesive strip, a hook-and-loop fastener, snaps and buttons.

Figure 5:
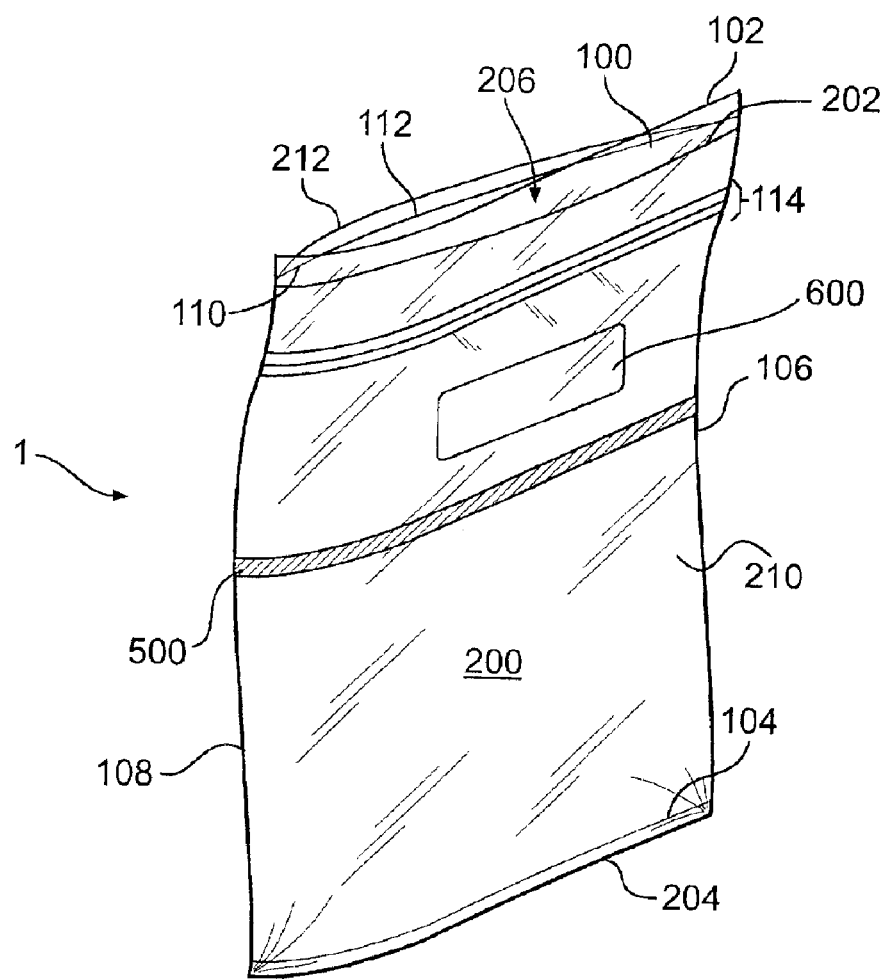
FIG. 5 shows a perspective view of a reclosable container with an adhesive strip between an external jacket and a bag according to this invention.

As shown in FIG. 2, the length of the jacket 200 preferably extends so that the top 202 of the jacket 200 is just below the zipper 114. Alternatively, the length may extend so that the top 202 is just past the zipper 114 near the top 102 of the bag 100, as shown in FIG. 5. The length of the jacket 200 may also extend so that the top 202 of the jacket 200 is disposed, for example, approximately half way between the bottom 104 and the top 102 of the bag 100, or half way between the bottom 104 and the zipper 114. Any length of the jacket 200 is appropriate, provided the jacket 200 is long enough to hold tap water or other fluid placed into the volume 206. Moreover, the width of the jacket 200 may be the same as the bag 100, or wider or narrower than the bag 100.

As shown in FIGS. 1 and 2, the top 202 of the jacket 200 is preferably unattached to the bag 100 along the entire width of the top 202, so that a fluid can be poured into the volume 206 between the bag sides 110, 112 and the jacket sides 210, 212. However, the top 202 may be permanently attached along a portion of the top 202 and unattached elsewhere. By "permanently attached," it is meant that the attachment is not reclosable, i.e., the top 202 cannot be opened and closed without tearing or otherwise destroying part of the container 1. For example, and without limiting the invention to these examples, the top 202 may be permanently attached to the bag 100 intermittently, permanently attached to the bag 100 along the top 202 except in the middle, or permanently attached to the bag 100 along the top 202 except near the lateral edges 106, 108 of the bag 100. Essentially, the top 202 of the jacket 200 may be secured or unsecured to the bag 100 in any manner, provided a user is able to pour fluid into the volume 206.

Although the bag 100 is shown in FIGS. 1 and 2 as preferably formed from a single sheet folded at the bottom 104, the bag 100 does not need to be formed from a single sheet. That is, the bag 100 may be formed from two separate sheets that are attached at the lateral edges 106, 108 and at the bottom 104 of the bag 100. Similarly, the jacket 200 may be formed from two sheets attached at their lateral edges and also at the bottom 204 of the jacket 200.

As shown in FIGS. 1 and 2, the bag and jacket bottoms 104, 204 are unattached to each other over the entire width of the bottom, so that a fluid entering through the top 202 of the jacket 200 on one bag side 110 can move to the other bag side 112 and vice versa. Although the entire widths of the bottoms 104, 204 are unattached in FIG. 2, one of ordinary skill will understand that any part of the widths of the bottoms 104, 204 may be unattached. Moreover, instead of being unattached, the bag 100 and jacket 200 may be attached to each other along the entire widths of the bottoms 104, 204, or a portion of the widths.

FIG. 1 shows the jacket 200 permanently attached to the bag 100 along the lateral edges 106, 108. However, the jacket 200 may be permanently attached to the bag 100 elsewhere, such as near, but not on the lateral edges 106, 108. In addition, the jacket 200 may be attached to the bag 100 intermittently, or by way of a plurality of continuous seals arranged in parallel. A seal attaching the jacket 200 to the bag 100 may also be a variety of thicknesses, from a negligible thickness to a band. An example of a band seal is shown in U.S. Pat. No. 3,494,457 to Titchenal, which is also incorporated herein by reference. Moreover, the length of the seal permanently attaching the jacket 200 to the bag 100 may extend from the bottom 104 of the bag 100 to the top 202 of the jacket 200, or over a portion of that length.

The bag 100 may optionally have grip strips 116, as shown in FIG. 2. The grip strips 116 allow a consumer to grip the bag 100 to separate the zipper 114. As one of ordinary skill will appreciate, grip strips may also be provided on the jacket 200.

Figure 3:
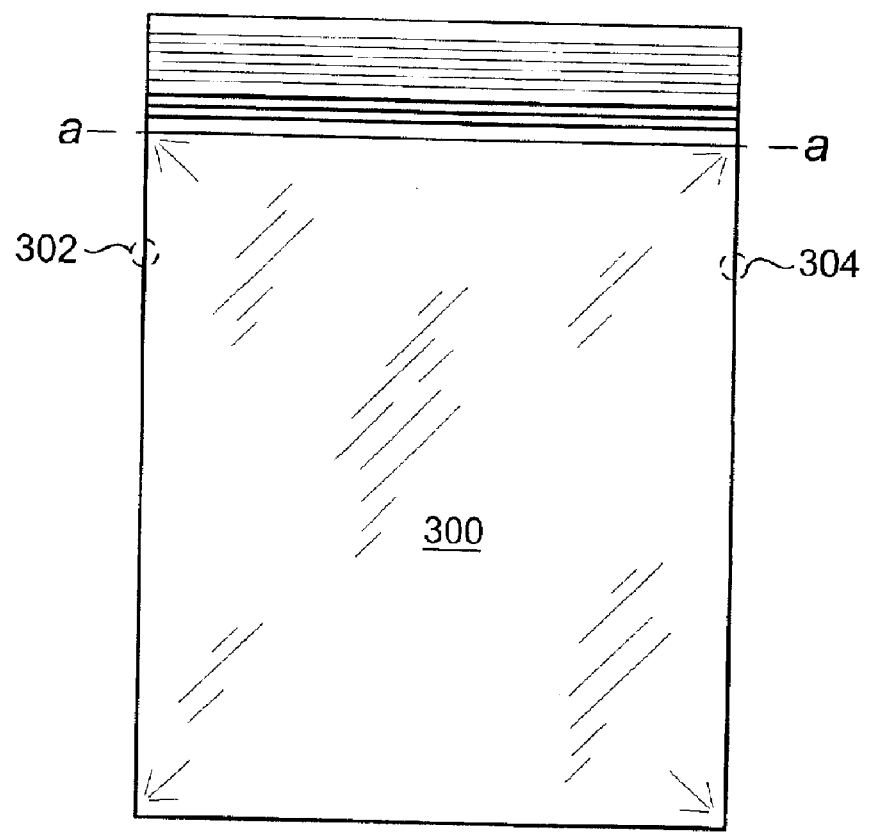
FIGS. 3 and 4 show components of a container according to this invention prior to being assembled by hand.
Figure 4:
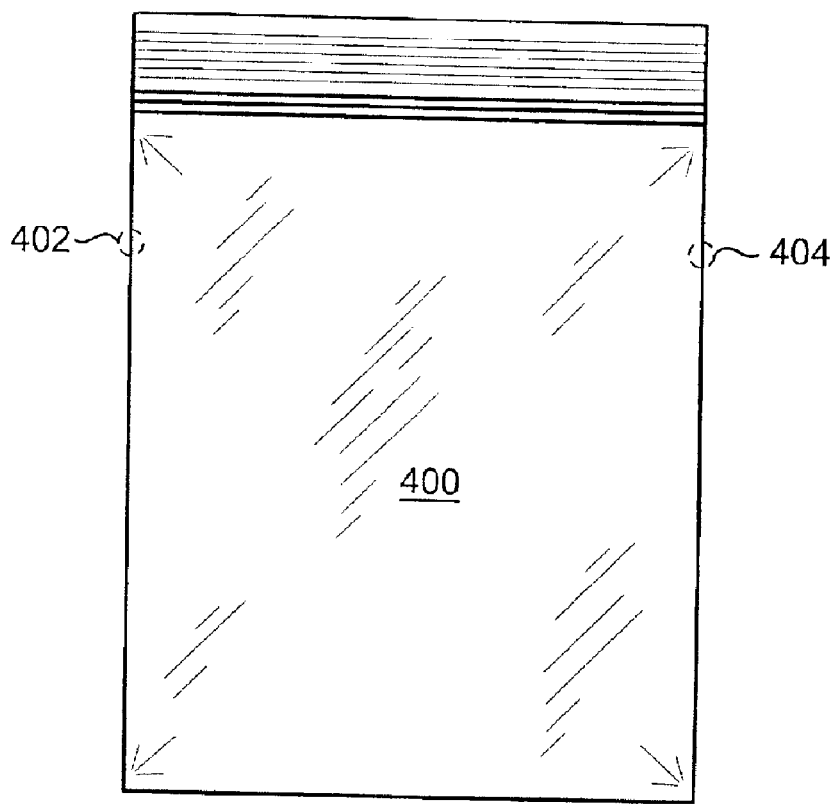

A process for forming the container 1 by hand is illustrated in FIGS. 3 and 4. Two identical bags 300, 400 of the type shown in FIGS. 3 and 4 are provided. The first bag 300, which will form the jacket 200, is cut along line a—a. Then, lateral edge 302 is trimmed off. The seal along lateral edge 304 remains. This modified first bag 300 is placed over the second bag 400, so that the lateral edge 402 of the second bag 400 corresponds to lateral edge 302 of the first bag 300. Subsequently, the lateral edge 302 of the first bag 300 is sealed to the lateral edge 402 of the second bag 400. Finally, the lateral edge 304 is sealed to the lateral edge 404, creating a bag 100 with a jacket 200. Although the container 1 may be formed by hand, one having ordinary skill in the art recognizes that such bags can readily be made by machine, preferably in a continuous process.

Means of attaching the jacket 200 to the bag 100 to form the container 1 of the present invention may be any means known in the art. Useful examples of attaching means are disclosed in U.S. Pat. No. 5,804,265 to Saad, et al. and U.S. Pat. No. 4,913,761 to Russell, et al., each of which is incorporated herein by reference. These and other examples include hot air hem sealing, hot wire sealing, hot knife sealing, supported hot wire sealing, extrusion lamination (extruded thermoplastic film between the film layers of the lamination), hot melt adhesive, heated bar heat sealing, ultrasonic sealing, heated rollers or belts, adhesive film strips, infrared sealing, radio frequency sealing, or vibration welding.

Generally, the container according to the present invention is made from a thermoplastic material or a blend of thermoplastic materials. The container may also be made from a plurality of layers of co-extruded films as disclosed in U.S. Pat. No. 5,292,392 to Miller, et al., incorporated herein by reference. The films may be made by a conventional cast or blown film process. The bag 100 and jacket 200 are preferably made of a material that is at least as impermeable to air and water as EVOH or S.C. Johnson & Son, Inc.'s SARAN (Racine, Wis.). The bag 100 may be the same material as the jacket 200, or a different material. The jacket 200 material may be a wider array of materials since it will not come in contact with food and may even be post-consumer recycled material.

Suitable thermoplastics include, for example, polyolefins such as high density polyethylene (HDPE), low density polyethylene (LDPE), linear low density polyethylene (LLDPE), and polypropylene (PP); thermoplastic elastomers such as styrenic block copolymers, polyolefin blends, elastomeric alloys, thermoplastic polyurethanes, thermoplastic copolyesters, and thermoplastic polyamides; polymers and copolymers of polyvinyl chloride (PVC), polyvinylidene chloride (PVDC), S.C. Johnson & Son, Inc.'s SARAN polymers (Racine, Wis.), ethylene/vinyl acetate copolymers, cellulose acetates, polystyrene, thermoplastic polyvinyl alcohols; single site catalyst resins such as Dow Chemical Company's INSITE® (Midland, Mich.); and nylons such as non-crystalline nylons or DUPONT® brand amorphous nylons (Wilmington, Del.). Preferably, the bag 100 and the jacket 200 are both made of polyethylene and more preferably from a blend of low density polyethylene (LDPE) and linear low density polyethylene (LLDPE), which is preferred for its greater tear strength.

The thickness and strength of the material used for the bag 100 and/or jacket 200 may vary widely. However, the material should be thick enough and strong enough to resist punctures, but flexible enough to conform to the food and to expel air from between the bag 100 and the food when fluid is placed into the volume 206. Thus, the thickness of the material can be anywhere from 1 to 4 mils and preferably has an elastic modulus below 50,000 psi. A thinner bag 100 and jacket 200 may be preferred since thinner components use less material, lowering costs. Alternatively, thicker components may be used if extra puncture resistance is desired for certain applications. Even with thin components, however, the container 1 has excellent puncture resistance owing to the compound bag/jacket construction.

Many variations of the bag 100 and jacket 200 are possible. For example, the bag 100 and jacket 200 may be different colors. The bag 100 or jacket 200 or both may have curled in or curled out edges at the tops 102, 202 thereof, or the tops 102, 202 may be different colors. Also, the bag 100 or jacket 200 may have a print strip 600, as shown in FIG. 5, allowing a consumer to label the contents of the container.

Moreover, the jacket 200 may vary in thickness. For example, the jacket 200 may be thicker at the bottom 204 and thinner at the top 202, thus lowering material cost. As a further alternative, the jacket 200 may be comprised of a relatively weak material, such as LDPE, and the bag 100 comprised of a relatively strong material, such as HDPE. The combination of the strong and weak materials allows the jacket 200 to be ripped off and discarded, if one-time use is desired.

Figure 6:
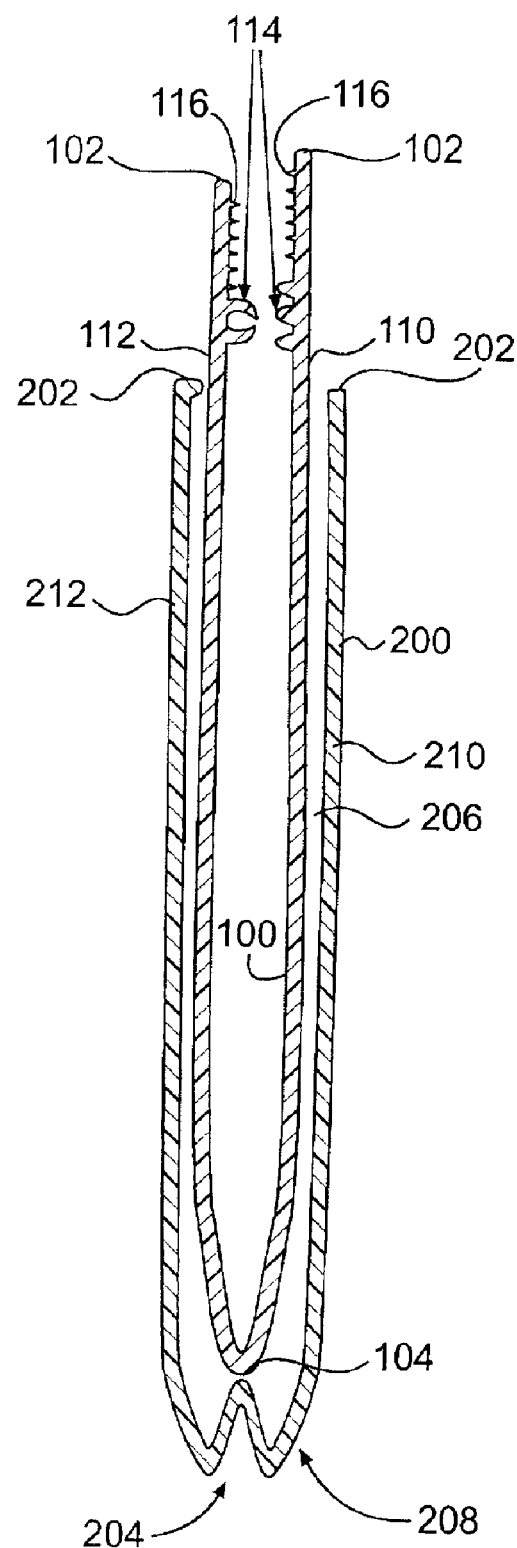
FIG. 6 shows a sectional view of a reclosable container with a pleated jacket according to this invention.

Yet another alternative is shown in FIG. 6, in which a pleat 208 is provided at the bottom 204 of the jacket 200. The pleat 208 allows the bottom of the jacket 200 to expand and may allow the container 1 to stand upright when the jacket 200 contains fluid.

In another alternative, the jacket 200 may be expandable so that it can hold a greater volume than the bag 100. The expandable jacket 200 may be provided by making the jacket sides 210, 212 with a plurality of vertically-oriented pleats, which unfold as the jacket 200 is filled. Of course, an expandable bag 100 may also be provided that is expandable in the same way.

In another alternative shown in FIG. 5, an adhesive strip 500 is provided facing the bag 100 approximately one half of an inch down from the top 202 of the jacket 200. The adhesive strip 500 temporarily maintains the jacket 200 in contact with the bag 100, and may be any tacky substance known in the art, such as EVA. In addition, the adhesive strip 500 may be a different color from other components of the container 1, to add consumer appeal to the container 1. The adhesive strip 500 may extend along the entire width of the jacket 200 as shown in FIG. 5, or it may extend intermittently, or partially, across the width of the jacket 200.

Figure 7:
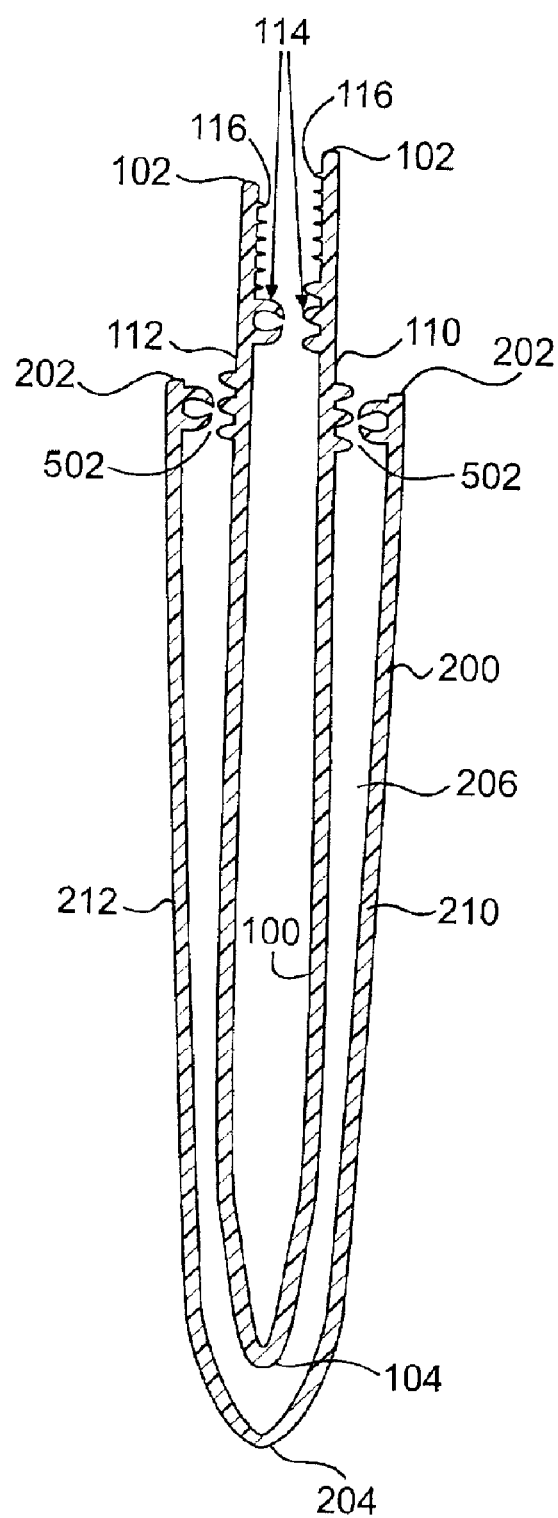
FIG. 7 shows a sectional view of a reclosable container with a zipper between the jacket and the bag.

As an alternative to the adhesive strip 500, a jacket zipper 502, such as may be used for the zipper 114 on the bag 100, may be used between the bag 100 and the jacket. FIG. 7 shows such an embodiment. The jacket zipper 502 allows the jacket 200 to retain fluid without leaking. Of course, closures other than an adhesive strip or a zipper may be used between the bag 100 and jacket 200, such as those closures previously discussed with regard to the alternatives to the bag zipper 114. Furthermore, different combinations of jacket closures and bag closures may be used, and the present invention is not limited only to the embodiments shown.

Preferred implementations of the container 1 will now be described. Food is placed inside the bag 100, and, with the top 102 of the bag 100 left open, a fluid such as tap water is poured into the volume 206 between one bag side 110 and one jacket side 210 through the jacket top 202. Since the bottoms 104, 204 of the bag 100 and jacket 200 are not attached to each other, fluid entering one side 110 flows to the other side 112, thus evenly forcing air out from between the bag 100 and the food as the fluid fills the volume 206. All or almost all of the air is expelled, decreasing the potential for freezer burn. The top 102 of the bag 100 is then closed via the zipper 114 or other closure. Excess fluid is then removed from the volume 206 by turning the container 1 upside down, and the container 1 is placed in a freezer.

If the adhesive strip 500 is provided between the bag 100 and the jacket 200, a user may fill the volume 206 with the fluid by separating the jacket 200 from the bag 100 over only a small area, such that only part of the adhesive strip 500 connects the bag 100 to the jacket 200. The user then pours the fluid into the relatively small separated area.

When the jacket zipper 502 is provided, the user may fill the volume 206 between the bag 100 and the jacket 200 with fluid, close the jacket zipper 502, and freeze the whole container 1, including the fluid, creating a convenient and portable ice pack. Of course, one of ordinary skill will appreciate that any fluid that may be been frozen, besides water, may be used to form the ice pack.

When a consumer is ready to thaw the food, the consumer may use a variety of methods depending on whether the container 1 was frozen with fluid in the volume 206. If the food was frozen without fluid in the volume 206, then the consumer may thaw the food by placing or flushing warm fluid through the volume 206. Alternatively, conventional means may be used to thaw the food such as placing the container 1 in boiling or warm water or another relatively warm environment. In addition, the consumer may place container 1 in the microwave. It is believed that the combination of the bag 100 and the jacket 200 will prevent the formation of hot spots when the container 1 is microwaved in this manner.

If the food was frozen with the fluid in the volume 206, creating an ice pack as previously described, the food is thawed by first thawing the frozen fluid in the volume 206. Any of the conventional means may be used to thaw the fluid, such as placing the container 1 in boiling or warm water or other relatively warm environment, or using a microwave. Once the fluid is thawed, it may or may not be removed from the volume 206. If the thawed fluid is not removed, the consumer may simply place the container 1 in the microwave or in boiling or warm water or other relatively warm environment to thaw the food. If the thawed fluid is removed, the food may be thawed by placing warm fluid in or flushing warm fluid through the volume 206, or by placing the container 1 in the microwave.

While the present invention has been described with respect to what are at present considered to be the preferred embodiments, it should be understood that the invention is not limited to the disclosed embodiments. To the contrary, as exemplified above, the invention is intended to cover various modifications and equivalent arrangements included within the spirit and scope of the appended claims. Therefore, the scope of the following claims is intended to be accorded the broadest reasonable interpretations so as to encompass all such modifications and equivalent structures and functions.

INDUSTRIAL APPLICABILITY

The container according to our invention is suited for storing food for freezing, and is particularly useful for preventing or reducing freezer burn. The container includes a flexible bag for receiving food and an external, flexible jacket. The method of using the container according to our invention is a useful way to prevent or reduce freezer burn.

We claim:

1. A container for use in storing food, comprising:

a flexible bag comprising at least two bag sides in an opposed relationship wherein each bag side has two lateral edges, a bag closure extending from one lateral edge to another lateral edge, and a bag bottom spaced from said bag closure; and a flexible jacket, external to said bag, said jacket comprising at least two jacket sides opposing said bag sides, and a jacket bottom, said jacket sides and said jacket bottom defining a volume into which part of said bag is disposed, such that said bag bottom is at least partially contained within the volume and is spaced from said jacket bottom;

said jacket further comprising a top disposed near said bag closure, wherein at least a portion of said top of said jacket is not permanently attached to said bag, said jacket is continuously attached to said bag along the lateral edges of said bag sides from said bottom of said bag approximately to said bag closure, and wherein each of the said jacket sides is shorter than the two bag sides.

2. A container according to claim 1, wherein said bag and said jacket are attached at the lateral edges of said bag.

3. A container according to claim 1, wherein said jacket is attached to said bag to allow fluid communication from one bag side to an opposed bag side.

4. A container according to claim 1, wherein said jacket is heat-sealed to said bag.

5. A container according to claim 1, wherein said jacket further comprises a jacket closure disposed on said jacket facing said bag adapted to temporarily maintain said jacket in contact with said bag.

6. A container according to claim 5, wherein at least one of said bag closure and said jacket closure is an adhesive strip.

7. A container according to claim 5, wherein at least one of said bag closure and said jacket closure is a zipper.

8. A container according to claim 1, wherein said container is comprised of material that is impermeable to air and water.

9. A container according to claim 1, wherein said jacket further comprises a pleat disposed at said bottom of said jacket, such that said container can stand upright when said jacket contains fluid.

10. A container according to claim 1, wherein one of said bag and said jacket further comprises a print strip for labeling contents of said container.

* * * * *